Aug. 4, 1953   E. C. QUEAR ET AL   2,647,283
METHOD OF MOLDING
Original Filed Dec. 13, 1947

INVENTORS
EUGENE C. QUEAR,
WILLARD C. SHAW &
JAMES R. EDWARDS
by Spencer Hardman ... Felix
their ATTORNEYS Patented Aug. 4, 1953

2,647,283

UNITED STATES PATENT OFFICE 2,647,283

METHOD OF MOLDING

Eugene C. Quear and Willard C. Shaw, Anderson, and James R. Edwards, Middletown, Ind., assignors to General Motors Corporation, Detroit, Mich., a corporation of Delaware Original application December 13, 1947, Serial No. 791,520. Divided and this application April 6, 1950, Serial No. 154,341

5 Claims. (Cl. 18—55)

This application is a division of application Serial No. 791,520, filed December 13, 1947, now Patent No. 2,569,535.

This invention relates to the art of molding thermosetting plastic compounds. The copending applications of C. A. Nichols et al., Serial No. 692,274, filed August 22, 1946, now Patent No. 2,523,137, and Serial No. 774,592, filed September 17, 1947, now Patent No. 2,531,524, disclose apparatuses for preheating comminuted molding material and dropping it into the open injection cylinder of a heated lower mold whose mold cavities are connected by runners with the cylinder. Immediately after charging it, the lower mold is moved under a heated upper mold which is caused to descend upon it with pressure and a ram or piston in the injection cylinder is caused to ascend to force the preheated material into the cavities provided by the engaging molds; and the material is cured under pressure and heat derived from the molds. The equipment disclosed in these applications has proved to be satisfactory in molding relatively small parts, for example, the molded parts of electric switches used on automobiles.

An object of the invention is to improve the method stated above in order to facilitate the molding of relatively large articles such as ignition distributor caps and ignition coil case covers. It has been discovered that the molding of relatively large articles as well as smaller ones can be facilitated if the preheated, loose, comminuted mold material is briquetted while hot before being placed while hot in the mold injection cylinder. The reasons for this are not entirely known but it is believed that compressing the preheated material tends to equalize the temperature of the mass of material and tends to expel from the mass vapors of volatile matter which each preheated particle gives off. Whatever the reasons may be, when the hot briquette of preheated material is compressed in the injection cylinder of the lower mold, it readily fills the mold cavities completely.

Therefore the invention embraces a method of preparing material for molding which comprises heating comminuted thermosetting material to a temperature at which chemical reaction is initiated and briquetting the heated material while still hot and a method of molding comprising the steps of preparing the material and the additional steps of placing the hot briquette in the compression chamber of a heated mold, causing engagement, under pressure, of said heated mold with a companion heated mold and compressing the hot material in said compression chamber to cause it to flow into cavities provided by the two molds while the molds are engaged under pressure which is maintained for a time sufficient to cure the material in the mold cavities.

Further objects and advantages of the present invention will be apparent from the following description, reference being had to the accompanying drawings, wherein a preferred embodiment of the present invention is clearly shown.

Figures 1, 2, 3, 4:
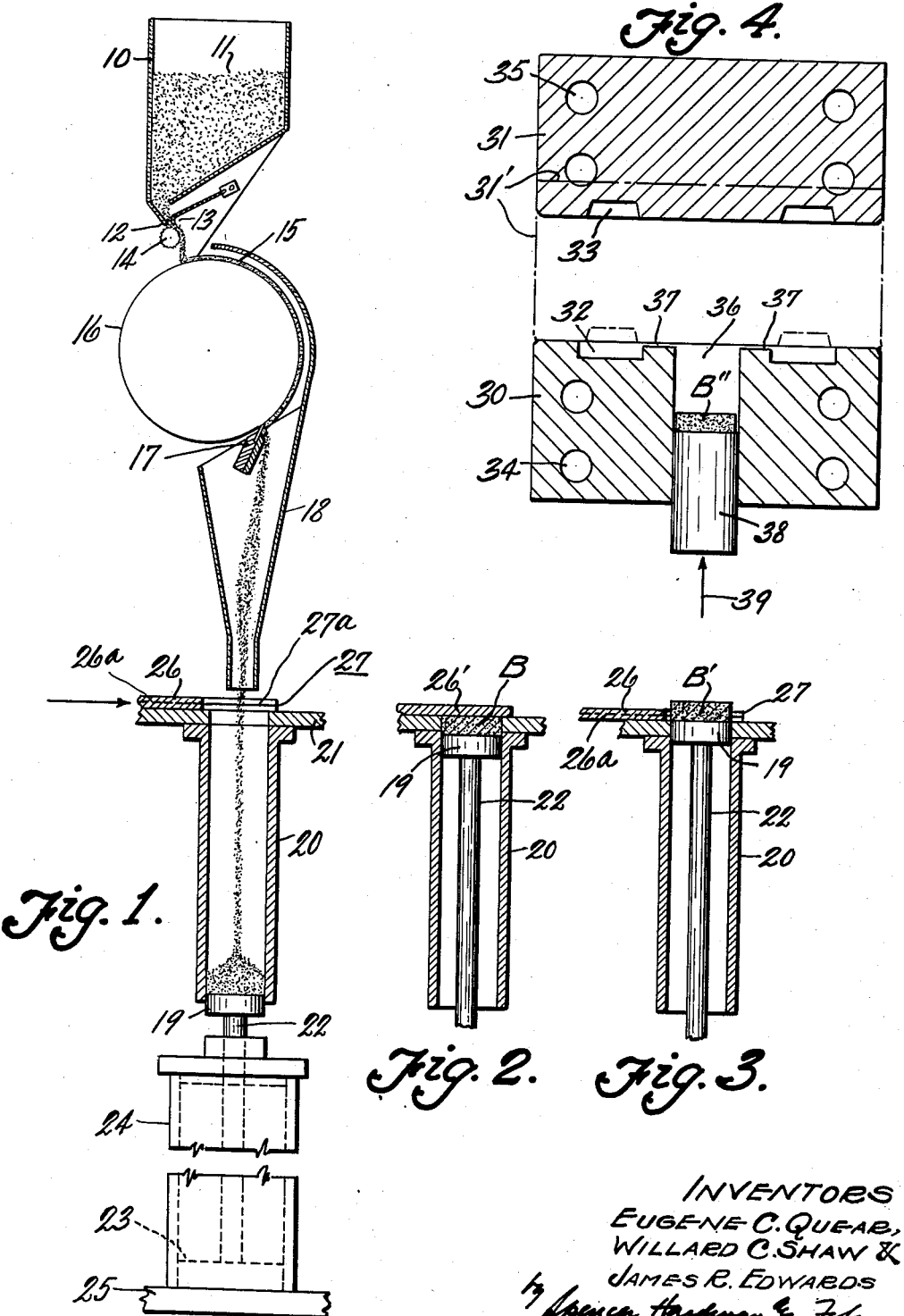
Fig. 1 is a diagram of apparatus for performing the methods of the present invention.
Figs. 2 and 3 show different operations of parts of the briquetting apparatus included in Fig. 1.
Fig. 4 is a diagram of the molds of a molding press.

Referring to Fig. 1, a hopper 10 contains a quantity of molding powder 11 which gravitates through an elongated opening in the bottom of the hopper and is received between a fixed plate 12 and an adjustable plate 13 from which the powder gravitates upon a knurled roller 14 which is rotated clockwise at a certain speed by an electric motor, not shown. By adjustment of member 13 the thickness of the layer of molding material deposited on roller 14 can be adjusted. Rotation of roller 14 causes the powder to be deposited in a layer 15 upon a heated roller 16, which rotates clockwise. The temperature of the roller 16 and its speed of rotation are such that the molding material is heated to a temperature such as to initiate the chemical reaction which is completed in the molding press.

The heating of the material of layer 15 causes its particles to become sticky and to tend to cling together and to the roller. This material is scraped from the roller 16 by scraper 17; and it descends through a funnel 18 upon a ram 19 slidable within a cylinder 20 supported by a plate 21. Ram 19 is actuated by rod 22 connected with a piston 23 in a cylinder 24 supported by a base 25. The quantity of material required for a molding operation is determined by adjustment of member 13 and the duration of rotation of roller 14. Rotation of roller 14 is stopped when a predetermined quantity of material has been deposited upon the ram 19. Then a plate 26 is caused to move to the position 26' (Fig. 2) to close the upper end of the cylinder 20. The plate 26 is guided for this movement by rails 27 having overhanging flanges 27a which engage side flanges 26a of plate 26, thus retaining plate 26 in engagement with the plate 21. After the plate 26 is moved to the position 26', pressure fluid is admitted to the lower end of cylinder 24 to cause the ram 19 to rise to compress the heated material into a briquette or pill B. While upward pressure on the ram 19 is momentarily relieved, the plate 26 is moved to normal position as shown in Fig. 3 in order to provide ejection of the pill by upward movement of the ram 19 as shown in Fig. 3. This movement places the pill at B' so that it can be removed by an operator who places it promptly in a molding press.

The molding press comprises a lower mold 30 and an upper mold 31 having molding cavities 32 and 33, respectively, and recesses 34 and 35, respectively, for receiving heating elements. Mold 30 has a compression cylinder 36 connected by runners 37 to mold cavities 32. Cylinder 36 receives a ram 38 upon which the pill, while still hot, is placed, as shown at B'' (Fig. 4) as quickly as possible after ejection of the position at B'. The mold 31 is caused to descend into position 31' upon the mold 30 against which it is maintained with pressure and the ram 38 is caused to move up, as indicated by arrow 39 to compress the pill at B'' to cause its material to flow through the runners 37 into the mold spaces provided by the mold cavities 32 and 33. The material in the cavities is cured under heat and pressure; and, after curing has been completed, the mold 31 is caused to rise and the ram 38 is caused to descend and the molded articles are removed from the press.

This process results not only in reduction of curing time but also in completely filling the mold cavities since the amount of volatile vapor which might be present in the material which was injected into the mold cavities is practically negligible.

While the embodiment of the present invention as herein disclosed, constitutes a preferred form, it is to be understood that other forms might be adopted, all coming within the scope of the claims which follow:

What is claimed is as follows:

1. In the method for making a plastic article of a defined shape from a thermosetting molding powder, the steps comprising; continuously spreading a thin layer of molding powder upon a moving surface heated to a temperature approaching but less than the irreversible reaction temperature of the powder; heating the powder by conduction by maintaining the powder relatively stationary with respect to said surface and in continuous and direct contact therewith until the powder attains the temperature of the surface; continuously removing hot powder from said surface; periodically briquetting a predetermined quantity of said hot powder into a self-sustaining briquet without permitting the powder to cool appreciably, then compressing the briquet in a hot mold into an article of the desired shape and size at a temperature sufficient to cause the irreversible reaction to occur, and finally ejecting the formed article.

2. In a method for making plastic articles in defined shapes from thermosetting molding powder, the steps comprising; providing a revolving drum having a horizontal axis and a relatively smooth external surface thereon, maintaining the external surface of said drum at a temperature approaching but less than the irreversible reaction temperature of the molding powder; continuously spreading a substantially uniform thin layer of molding powder on the external surface of said drum adjacent the top thereof; heating said molding powder by conduction while in continuous and direct contact with the surface of said drum over about 180° of a rotational turn thereof to a temperature approaching but less than the irreversible reaction temperature of the molding powder; continuously scraping the hot molding powder off the surface of said drum, collecting a predetermined quantity of said hot molding powder, briquetting said predetermined quantity of said hot molding powder into a self-sustaining briquet without cooling the powder appreciably; then molding the briquet under pressure in the mold of the desired shape and size and simultaneously heating the powder therein to a temperature in excess of the irreversible reaction temperature; and finally ejecting the finished article from the mold.

3. In a method for making plastic articles in defined shapes from thermosetting molding powder, the steps comprising; providing a revolving drum having a horizontal axis and relatively smooth external surface thereon, maintaining the external surface of said drum at a temperature approaching but less than the irreversible reaction temperature of the molding powder; continuously spreading a substantially uniform thin layer of molding powder on the surface of said drum; heating said molding powder by conduction while in continuous and direct contact with the surface of said drum over about 180° of a rotational turn thereof to a temperature approaching but less than the irreversible reaction temperature of the molding powder; continuously scraping the hot molding powder off the surface of said drum, briquetting predetermined quantities of said hot molding powder each being sufficient to make a plurality of articles, placing the briquet in a transfer press, transferring the hot briquetted molding powder from the press under pressure into a plurality of cavities of the desired shape and size while simultaneously heating the compressed powder in said cavities to a temperature sufficient to cause an irreversible reaction to take place; and finally ejecting the finished, molded articles from the cavities.

4. In the method for making a self-sustaining plastic article from a thermosetting molding powder, the steps comprising; continuously applying a thin layer of molding powder upon a moving surface heated to a temperature approaching but less than the irreversible reaction temperature of the powder; heating the powder by conduction by maintaining the powder relatively stationary with respect to said surface and in continuous and direct contact therewith until the powder attains the temperature of the surface; continuously removing powder from said surface; and then briquetting a predetermined quantity of said hot powder into a self-sustaining briquet without appreciably permitting the powder to cool.

5. In a method for making plastic articles from thermosetting molding powder, the steps comprising; feeding a substantially uniform thin layer of molding powder from a hopper onto the external surface of a rotating drum heated to a temperature approximating the irreversible reaction temperature of the molding powder; carrying the relatively thin layer of molding powder on said surface through a portion only of a complete turn of rotation of said drum wherein the speed of the drum is so regulated that the period of contact of the molding powder with the surface of the drum is sufficient for heating the molding powder to a temperature substantially the same as the drum temperature, scraping the heated molding powder off the surface of said drum at the time that the molding powder attains the desired temperature, and then immediately briquetting predetermined portions of said hot molding powder before it has cooled into articles of the desired shape in a hot die.

EUGENE C. QUEAR.
WILLARD C. SHAW.
JAMES R. EDWARDS.

References Cited in the file of this patent

UNITED STATES PATENTS

| Number | Name | Date |
| --- | --- | --- |
| 2,238,378 | Summerfield | Apr. 15, 1941 |
| 2,308,632 | Stenberg | Jan. 19, 1943 |
| 2,386,891 | Gregory, Jr. | Oct. 16, 1945 |
| 2,423,915 | Wacker | July 15, 1947 |
| 2,452,761 | Jesionowski | Nov. 2, 1948 |
| 2,477,258 | MacMillin | July 26, 1949 |
| 2,480,313 | Alden | Aug. 30, 1949 |